United States Patent [19]
Pott

[11] 3,913,728
[45] Oct. 21, 1975

[54] WIPING DEVICE FOR A CONVEYOR BELT

[75] Inventor: Richard Pott, Lage-Heiden, Germany

[73] Assignee: Stahlgruber Otto Gruber & Co., Munich, Germany

[22] Filed: Oct. 16, 1973

[21] Appl. No.: 406,777

[30] Foreign Application Priority Data
Oct. 20, 1972 Germany............................ 7238495

[52] U.S. Cl................................. 198/230; 198/230
[51] Int. Cl.²............................................ B65G 45/00
[58] Field of Search ...... 198/229, 230, 188; 15/245, 15/250.36, 250.4, 250.41, 250.42

[56] References Cited
UNITED STATES PATENTS
| | | | |
|---|---|---|---|
| 2,652,920 | 9/1953 | Bowman | 198/230 |
| 2,689,369 | 9/1954 | Biek | 15/250.4 |
| 3,161,285 | 12/1964 | Hummer et al. | 198/230 |
| 3,288,275 | 11/1966 | Bunting | 198/230 |

FOREIGN PATENTS OR APPLICATIONS
| | | | |
|---|---|---|---|
| 38,510 | 5/1965 | Germany | 198/230 |
| 826,420 | 7/1949 | Germany | 198/230 |

*Primary Examiner*—Evon C. Blunk
*Assistant Examiner*—Joseph E. Valenza
*Attorney, Agent, or Firm*—Connolly and Hutz

[57] ABSTRACT

An elongated wiper arm having a number of longitudinal ribs about its periphery is mounted on a crossbar with one of its ribs in contact with the conveyor. The crossbar is counterbalanced to bear against the conveyor, and the angular position of the crossbar and the wiper arm attached to it can be selectively varied to bring new ribs into contact with the conveyor as the operating rib wears down. The wiper is made of an elastomer such as rubber or polyurethane and it may be vulcanized or foamed directly on the crossbar.

18 Claims, 9 Drawing Figures

WIPING DEVICE FOR A CONVEYOR BELT

CROSS-REFERENCE TO RELATED APPLICATIONS IF ANY

None.

BACKGROUND OF THE INVENTION

This invention relates to a wiping device for conveyor belts in conveying machinery, consisting of a wiper and a supporting frame with means for achieving a uniform counter-pressure of the wiper on the conveyor belt as well as of a conveyor traversing carrier on which is attached the finned, ribbed or ridged wiper consisting of resilient rubber material.

Wipers for conveying machinery, particularly belt conveyors, are used for cleaning the discharge end of a conveyor belt of adhering conveyed material or residues or of diverting the conveyed material flow on the upper belt and transferring the wiped off conveyed goods onto associated devices.

Known wipers of this type, arranged at the underside of the belt, for example, usually consist of highly abrasion-proof soft rubber being held between two steel clamping strips. The wipers may then be moved in their holders towards the conveyor belt as they wear to the extent that the clamps permit it. The clamping strips with the wipers held in them are mounted on lever arms and are pressed against the conveyor belt by a weight movable on said lever arm, or the required pressure is applied by spring systems.

Also known are devices for belt cleaning, which operate with rotating rollers or brushes or rubber or synthetic material, but they incur considerable expense, because for their operation a special motor system must be used. This expenditure is costly and the operating reliability is low because the structural elements are susceptible to breakage.

On the other hand, a considerable disadvantage of the customary wipers is due to the fact that adjusting is achieved and requires a great expenditure of time — during which the conveyor belt must stand still. Consequently, the wiper is replaced, to the extent that its wear is noticed, only when it appears absolutely necessary to the operating or supervisory personnel. This means that often after the wiper lip or strip wears off, the metal clamp holder bears against the belt and digs into it, whereby the belt is damaged very quickly. Investigations have determined that about 30 to 40% of all damage to the valuable conveyor belts is attributable to careless wiper maintenance.

Object of this invention, therefore, is to provide a particularly simple, inexpensive wiper device, which combines an optimum of operating reliability and simplicity in maintenance with the greatest possible belt cleaning effect, a relatively long operating time and the shortest shutdown time for the replacement of the wiper.

SUMMARY

In accordance with the invention the conveyor traversing carrier is a crossbar whose ends are situated non-rotatably but angularly variable in a holding fixture on the carrying and pressing frame and that coaxially on the crossbar there is mounted a wiper, made of an elastomer such as a resilient rubber like material, with optionally applicable wiping edges extending in at least two directions.

The considerable advantage is achieved in that after the wearing down of applied rib of the wiper in the course of time, it is only necessary to raise the carrying and pressing frame for a short time and to turn the wiper to such a degree, e.g., by 90°, until a further wiping rib, not yet employed, becomes effective without having to use any tools for this purpose. The shutdown time is then minimal, and the life of such a wiper is many times that of conventional wipers.

In a particularly advantageous embodiment of the invention, the wiper comprises a rubber member, which has a cross-shaped profile and in the interior of which is arranged a square tube. Thereby the advantage is achieved that the life of such a wiper is quadrupled in comparison to the previously known wipers and that by the arrangement of a square tube as the supporting crossbar, a simple rectangular recess, e.g. in the lever arm provided with counterwieghts, is sufficient in order to securely fix the wiper and to execute the changeover, e.g., by 90°, in fractions of a minute.

Any damage to the belt by the novel wiper is completely prevented, because its wear is automatically indicated by a reduction of the wiping capacity as a result of lower relative surface pressure and consequently the service personnel is summoned for immediate action, whereby a psychological block of actually carrying out this maintenance manipulation is removed for the personnel by the simplicity of the changeover.

In accordance with a further aspect of the invention, the square tube may be inserted into the center of the cross-sectional area of the wiper, preferably by hot vulcanization and connected with the surrounding rubber by a rubber-metal connection. It is assured thereby that the resilient rubber part of the wiper is mounted firmly on the tube and even under great stress does not become detached from it.

It is furthermore possible, with the same — e.g., crossshaped — profile of the wiper, to manufacture it from other elastomers such as soft polyurethane foam or cast polyurethanes and thereby to foam in or insert the above-described tube.

A considerable advantage of the subject matter of the invention consists of the possibility of substantially completely using up the wiper, while in the previously known wipers there always remains a portion of the wiper within the clamping strips. Thus the flexible rubber material of the actually wiping part is considerably better utilized than in the earlier wiper constructions. Thereby is achieved the greatest economy and good value and the discarding of still relatively large but nevertheless useless rubber strips is avoided.

BRIEF DESCRIPTION OF THE DRAWING

The invention is explained in more detail below in exemplary embodiments shown in the drawing in which.

DESCRIPTION OF THE PREFERRED EMBODIMENTS

Figure 1:
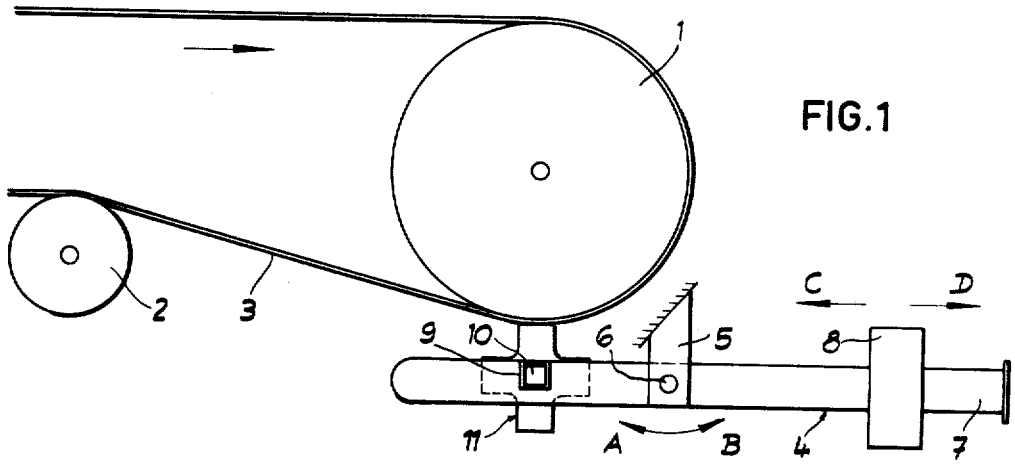
FIG. 1 is a reduced scale side elevational view of a novel wiper which is the embodiment of this invention working on a conveyor belt.

A novel wiper for a conveying machine, e.g., conveyor belt 3 conducted about guide drum 1 and idler pulleys 2, includes in a known manner a supporting frame 4, which is provided with means for achieving a uniform pressure. This consists of two supports 5 mounted on the frame of the equipment, wherein an axis of rotation is situated for two two-armed lever arms 7. In these supports 5, each lever arm is thus suspended as a counter-balance and may swing from the horizontal in the direction of arrows A–B. Each of the lever arms 7 carries a movable weight 8, which may be adjusted in an optional position to the axis of rotation in the direction of arrows C–D, as is customary for counterweights. On the side of the two-armed lever arm situated opposite the weight arrangement, each of the lever arms supports a holding fixture 9, here in the shape of a recess or socket, into which a crossbar 10 may be inserted as the conveyor traversing carrier. The recess grips the crossbar or its end shaft in a rotation locking manner. The end shaft may be a polygonal tube, preferably a square tube.

Figure 2:
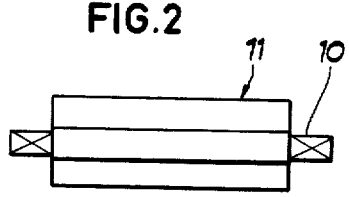
FIG. 2 is a front elevational view of the wiper of FIG. 1.
Figure 3:
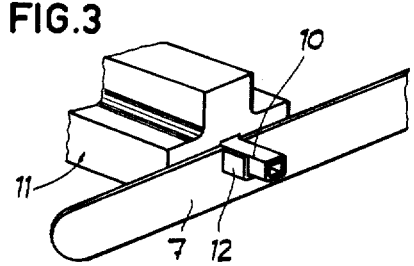
FIG. 3 is a perspective view of the wiper and part of the mounting frame shown in FIG. 1.

Crossbar 10 supports the effective wiper 11, which in FIGS. 1 and 2 is cross shaped. This effective wiper may have a diversity of shapes, with each of its wiping edges itself constituting a wiper. Upon angularly changing crossbar 10 in socket 9 of the lever arms 7, a new edge is brought into use as a new wiper. According to FIG. 3, socket 9 in lever arm 7 may be supplemented by a U-shaped support 12 for a reliable rotating-free mounting of the crossbar.

Figure 4:
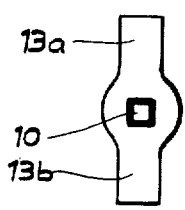
FIGS. 4–8 are end views of variations of the wiper shown in FIGS. 1–3.
Figure 5:
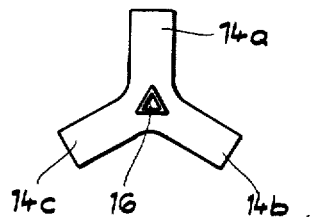
Figure 6:
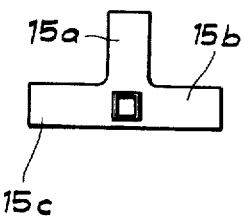

Various possible longitudinal rib arrangements and crossbar shapes are illustrated in FIGS. 4 through 8. The simplest form is illustrated in FIG. 4 with two rib edges 13a and 13b, which are situated 180° opposite each other. In FIGS. 5 and 6 are shown three wiper ribs each, one in a star shape (strips 14a–14c) and one in T-shape (ribs 15a–15c), and the traverse 16 in FIG. 5 having a triangular cross-section. The most advantageous is usually the cross shape of FIGS. 1, 2 and 7 through 9 because of its quadruple life; however, the useful life is governed by the amount of dirt encountered on belt 3 and by the material of which the wiper is made.

Figure 7:
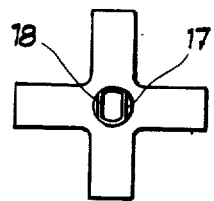
Figure 8:
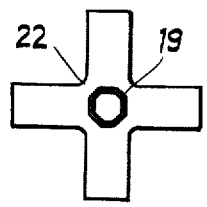
Figure 9:
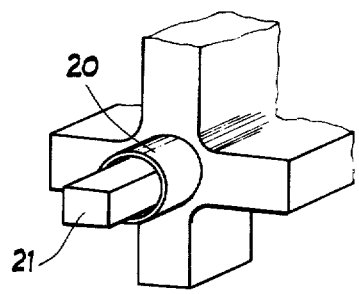
FIG. 9 is a partial perspective view of a partly used wiper which is another variation of this invention.

There is also the possibility of making the crossbar shaft round in cross-section when a satisfactory rubber-metal connection is provided. In this connection, an illustrative embodiment is shown in FIG. 7 wherein the round tube 17 is struck flat at its ends 18 in order to insert it securely into the holding fixture recess 9. The crossbar shaft in FIG. 8 is an octagon tube 19. A round crossbar shaft may also be utilized by the foaming of polyurethane onto tube 20, for example, in accordance with the illustration in FIG. 9, the ends of tubes 20 preferably accommodating square steel shaft ends 21, which are firmly welded within the tube and form the end shafts for engaging in holding fixture sockets 9 on lever arms 7.

By the effect of weight 8 and the swing of the particular lever arm 7, the wiper presses from below against the conveyor belt 3 and thus remains in a substantially constant uniform counterpressure. Other pressing systems and supporting frames may also be employed in conjunction with this novel wiping device.

In order to prevent a distortion and a breaking off of the rubber ribs, a hot vulcanized rubber-metal bond may be utilized, wherein the wiping ribs may additionally be connected together by radii 22. Such a wiper may be manufactured dependably and economically.

I claim:

1. A wiping device for a conveyor belt comprising an elongated wiping crossbar having a plurality of longitudinal peripheral ribs of wiping material, a movable mounting frame for disposition adjacent the conveyor belt, shaft and socket means mounting the wiping crossbar on the mounting frame with one of its ribs in contact with the conveyor belt, counter-balancing means reacting against the frame for causing the wiping crossbar to bear against the conveyor belt, the socket means comprising polygonal socket means in the mounting frame, the shaft means having a longitudinal axis and, polygonal end surface means fitting within the polygonal socket means and non-rotatably engaging within the polygonal socket means in a number of different angular positions of the shaft and wiping crossbar means about their longitudinal axis, the polygonal socket means having an open side whereby the polygonal shaft end surface means may be inserted therein and removed therefrom, and the ribs on the wiping crossbar being coordinated with the polygonal shaft end surface means, to permit the angular orientation of the wiping crossbar to be varied about its longitudinal axis and selectively fixed in a number of positions related to the ribs whereby different ribs of the crossbar can each be placed into contact with the conveyor belt for renewing the wiping surface after it becomes worn.

2. A device as set forth in claim 1 wherein the wiping crossbar comprises an elastomer.

3. A device as set forth in claim 2 wherein the elastomer comprises soft rubber.

4. A device as set forth in claim 3 wherein the elastomer comprises a polyurethane.

5. A device as set forth in claim 4 wherein the polyurethane comprises a foam.

6. A device as set forth in claim 4 wherein the polyurethane comprises a cast polyurethane.

7. A device as set forth in claim 3 wherein the crossbar includes a shaft and the rubber is vulcanized upon the shaft.

8. A device as set forth in claim 1 wherein the wiping crossbar has a pair of ribs disposed 180° opposite each other.

9. A device as set forth in claim 1 wherein the ribs are arranged in a T shape.

10. A device as set forth in claim 1 wherein the ribs are arranged in a star shape.

11. A device as set forth in claim 1 wherein the ribs are arranged in a cross shape.

12. A device as set forth in claim 1 wherein a square shaft is axially disposed in the wiping crossbar, and the ribs on the crossbar being angularly aligned with the sides of the shaft.

13. A device as set forth in claim 1 wherein a shaft is axially disposed within the crossbar, the shaft having a polygonal cross-section having a number of flat surfaces, and the ribs on the crossbar being angularly aligned with the flat surfaces.

14. A device as set forth in claim 1 wherein a shaft is axially disposed within the crossbar, the shaft having a flattened oval cross-section with longer and shorter sides, and the ribs of the crossbar being angularly aligned with the sides.

15. A device as set forth in claim 1 wherein the shaft and socket means comprises a rectangular socket in the mounting frame and rectangular shafts on the crossbar.

16. A wiping device as set forth in claim 1 wherein the polygonal socket means has an open top surface, and the polygonal shaft end surface means is inserted through the open top surface.

17. A device as set forth in claim 1 wherein the counter-balancing means comprises a variable counterweight and lever assembly.

18. A device as set forth in claim 1 wherein the wiping crossbar has a hub, and the hub being thicker than the ribs whereby wearing down of a rib is safely indicated by the reduction in wiping capacity resulting from the reduction in surface pressure when the hub bears on the belt.

* * * * *